United States Patent
Hon et al.

(10) Patent No.: US 11,652,428 B2
(45) Date of Patent: May 16, 2023

(54) METHOD AND APPARATUS FOR CONTROLLING A MOTOR

(71) Applicant: General Electric Company, Schenectady, NY (US)

(72) Inventors: Robert Charles Hon, Walton, KY (US); Paul Robert Gemin, Cincinatti, OH (US); Thomas William Brown, Cincinatti, OH (US); Gregory Lee Detweiler, Cincinatti, OH (US)

(73) Assignee: General Electric Company, Schenectady, NY (US)

(*) Notice: Subject to any disclaimer, the term of this patent is extended or adjusted under 35 U.S.C. 154(b) by 119 days.

(21) Appl. No.: 17/375,234

(22) Filed: Jul. 14, 2021

(65) Prior Publication Data

US 2023/0018997 A1    Jan. 19, 2023

(51) Int. Cl.
*H02P 21/00* (2016.01)
*H02P 6/10* (2006.01)
*H02P 6/12* (2006.01)
*H02P 6/06* (2006.01)

(52) U.S. Cl.
CPC .................. *H02P 6/10* (2013.01); *H02P 6/06* (2013.01); *H02P 6/12* (2013.01)

(58) Field of Classification Search
CPC .................. H02P 6/06; H02P 6/10; H02P 6/12
USPC .................................................... 318/400.02
See application file for complete search history.

(56) References Cited

U.S. PATENT DOCUMENTS

| | | | |
|---|---|---|---|
| 4,418,308 | A | 11/1983 | Bose |
| 4,453,116 | A | 6/1984 | Bose |
| 4,926,105 | A | 5/1990 | Mischenko et al. |
| 7,348,756 | B2 | 3/2008 | Ma et al. |
| 7,687,928 | B2 | 3/2010 | Taneja et al. |
| 7,872,441 | B2 | 1/2011 | Gallegos-Lopez et al. |
| 8,030,788 | B2 | 10/2011 | Xu et al. |
| 8,421,391 | B2 | 4/2013 | Yeh et al. |
| 8,884,571 | B2 | 11/2014 | Okita et al. |
| 9,083,271 | B2 | 7/2015 | Kim et al. |
| 9,183,983 | B2 | 11/2015 | Liffring et al. |
| 9,487,104 | B2 | 11/2016 | Jang et al. |

(Continued)

FOREIGN PATENT DOCUMENTS

EP          2161829 A2    3/2010

*Primary Examiner* — Kawing Chan
*Assistant Examiner* — Gabriel Agared
(74) *Attorney, Agent, or Firm* — McGarry Bair PC (57) ABSTRACT

A system for controlling a motor includes a controller module comprising a controller portion, a regulator portion and an integrator portion. The regulator portion includes a set of regulator modules communicatively coupled in a sequence. Each regulator module configured to receive a respective input signal, indicative of a target or selected value, from the controller portion or the immediately preceding regulator module in the sequence, determine a respective selectable value; select one of the respective selectable value and the value indicated by the received input signal; and provide the selected value as an output signal to the next regulator module in the sequence or the integrator module. The integrator module is configured to receive the output signal from the last regulator module in the sequence, calculate a final demand value based on the received signal, and provide an output signal indicative of the final demand value.

20 Claims, 3 Drawing Sheets

(56) References Cited

U.S. PATENT DOCUMENTS

| | | | |
|---|---|---|---|
| 9,670,917 B2 | 6/2017 | Nakajima et al. | |
| 2009/0072778 A1* | 3/2009 | Schulz | H02P 6/10 |
| | | | 318/721 |
| 2010/0320953 A1* | 12/2010 | Yeh | H02P 21/06 |
| | | | 318/490 |
| 2011/0043160 A1* | 2/2011 | Serban | G05F 1/67 |
| | | | 320/101 |
| 2011/0089882 A1* | 4/2011 | Yeh | G01R 31/343 |
| | | | 180/65.285 |
| 2011/0279074 A1* | 11/2011 | Yeh | G01K 13/08 |
| | | | 318/473 |
| 2018/0097461 A1* | 4/2018 | Ballal | H02P 21/22 |
| 2019/0199270 A1 | 6/2019 | Oba | |
| 2022/0317706 A1* | 10/2022 | Moy | G05B 23/024 |

* cited by examiner

METHOD AND APPARATUS FOR CONTROLLING A MOTOR

TECHNICAL FIELD

This disclosure relates to a control device and method for controlling a motor, and more specifically to controlling an output of an inverter-driven motor.

BACKGROUND

Conventional power systems manage the supplying of power from power sources, such as motors and generators, to electrical loads. In one non-limiting example of an aircraft, gas turbine engines are used for propulsion of the aircraft, and typically provide mechanical power which ultimately powers a number of different accessories such as generators, starter/generators, motors, permanent magnet alternators (PMA), fuel pumps, and hydraulic pumps, e.g., equipment for functions needed on an aircraft other than propulsion. For example, contemporary aircraft need electrical power for avionics, motors, and other electric equipment. A generator coupled with a gas turbine engine will convert the mechanical power of the engine into electrical energy which is distributed throughout the aircraft by electrically coupled nodes of the power distribution system.

Inverters, sometimes called variable frequency drives (VFD) or adjustable speed drives, are electronic devices that convert DC (Direct Current) to AC (Alternating Current). Conventional inverters are increasingly used to control a speed or torque output for electric motors and generators. Conventional inverters provide an adjustable output signal to a motor, allowing precise control of the motor speed or torque.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Aspects of the disclosure can be implemented in any environment, apparatus, system, or method for a circuit regardless of the function performed by the circuit.

As used herein, the term "set" or a "set" of elements can be any number of elements, including only one. Additionally, while terms such as "voltage", "current", and "power" can be used herein, it will be evident to one skilled in the art that these terms can be interrelated when describing aspects of the electrical circuit, or circuit operations.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads applied to the bus. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

As used herein, a "controller", for example, "controller module", "regulator module", "integrator module" can include a component configured or adapted to provide instruction, control, operation, or any form of communication for operable components to affect the operation thereof. Such controllers or modules can include any known processor, microcontroller, or logic device, including, but not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (P), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof. While described herein as comprising separate elements, in non-limiting aspects such controllers and modules can be incorporated on one or more devices including a common device, such as a single processor or microcontroller. Non-limiting examples of such controllers or module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module, regulator module, or integrator module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

The exemplary drawings are for purposes of illustration only and the dimensions, positions, order and relative sizes reflected in the drawings attached hereto can vary. Furthermore, the number of, and placement of, the various components depicted the Figures are also non-limiting examples of aspects associated with the disclosure. For example, while various components have been illustrated with relative position of etc., aspects of the disclosure are not so limited, and the components are not so limited based on their schematic depictions.

Electric machines, such as electric motors or electric generators, are used in energy conversion. In the aircraft industry, it is common to use motors and generators in various critical applications. For example, in some aircraft having a gas turbine engine, an electric machine can be used to provide power to the turbine compressor. In other instances, electric machines can combine a motor mode and a generator mode in the same device, where the electric machine in motor mode functions to start the engine, and, depending on the mode, also functions as a generator. Regardless of the mode, an electric machine typically includes a rotor and a stator with windings that are driven to rotate the rotor, which for some aircraft may include the gas turbine engine. In some instances, the electric machine is physically capable of generating or inputting more power than desired or needed. In these instances, the electric machine can employ control mechanisms or schemes to prevent delivery or extraction of excess power to or from a turbine compressor or downstream loads.

Conventional motors controls and variable frequency drives utilize a variety of control schemes to control operation of AC motors. For example, conventional proportional-integral-derivative (PID) controllers employ a control loop mechanism to continuously calculate an error value as the difference between a desired setpoint (SP) and a measured process variable (PV) and apply a correction based on proportional, integral, and derivative terms. However, in some instances, especially, when relatively large differences exist between the SP and PV, regulation of the corrective signal is necessary to avoid "overcorrection" or rapid step changes in motor excitation. Accordingly, without the precise regulation of the corrective signal, particularly in instances with a relatively large differential between SP and PV, an increase in the current provided to the motor that can exceed predetermined current limits, or can result in a sudden acceleration or speed of the motor that exceeds predetermined operating constraints such as acceleration, deceleration, torque, or speed limits of the motor. Additionally, such predetermined operating constraints can often have predetermined relative priorities with respect to each other, that must be considered when implementing typical motor control systems.

For example, an aircraft operating during flight man may have a conventional electric machine operating in a "motoring mode", (e.g., the stator terminals connected to an AC supply, with the rotor rotating in the direction of the stator rotating magnetic field) providing power to a turbine compressor. While operating at a point in which the pilot is demanding constant thrust, conventional controls may be configured to significantly increase the "motoring" torque output level of the electric machine for efficiency, fuel savings, or other reasons which can ultimately cause a dramatic reduction of fuel to the engine with a possible resultant flameout condition of the turbine combustor. By way of another example, an aircraft having conventional controls may provide a corrective control signal to an electrical machine operating in a "generating mode" to cause the electrical machine to significantly increase its "generating" torque output level, which can result in an instability of the engine's operating cycle and a consequent non-recoverable engine surge.

Aspects as disclosed herein provide a closed-loop regulated controller that can be implemented, cooperative with an inverter, to provide regulation of a corrective signal based on a series of regulators, each configured to regulate a corrective signal with respect to a respective predefined parameter. Such aspects allow for a simple implementation while enabling prioritization of the regulated parameters.

Figure 1:
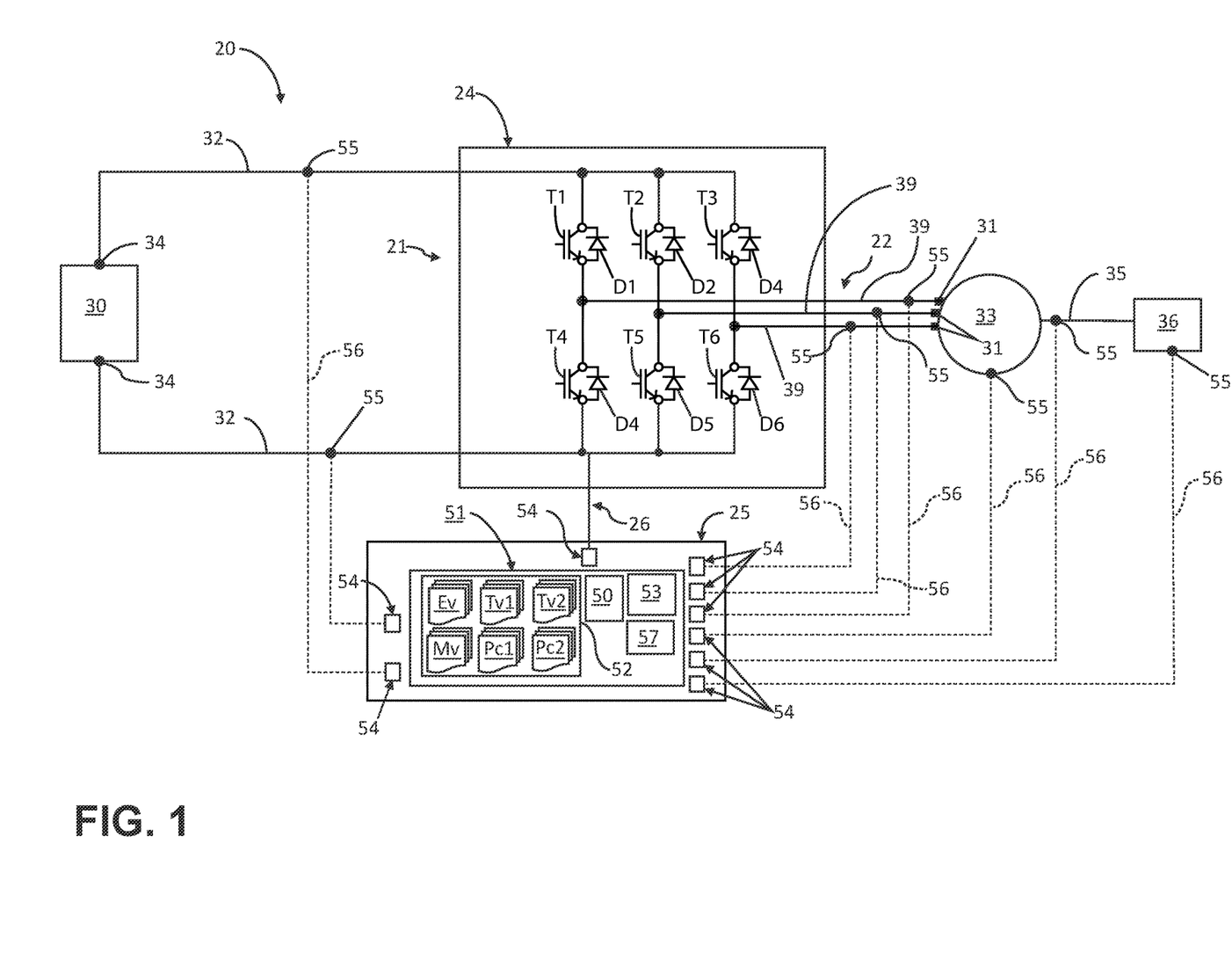
FIG. 1 illustrates schematic view of a motor control system in accordance with various aspects described herein.

FIG. 1 illustrates in a schematic configuration of an aspect of a motor control system 20 for controlling operation of a motor 33 in accordance with a non-limiting aspect of the present disclosure. As illustrated, the system 20 includes an inverter 24, and an electronic control unit 25 comprising a controller module 51. The controller module 51 can comprise a memory 52 and a control portion or module 57, a regulator portion or module 50 and an integrator portion or module 53. The motor control system 20 can be coupled to a power source 30, such as a battery or other power storage device, to receive electrical power therefrom. The motor control system 20 can be communicatively coupled to a motor 33, operative to provide power thereto to generate a motor torque. In non-limiting aspects, the motor 33 can be further coupled to a load 36. A set of sensors 55 can be communicatively coupled to the electronic control unit 25. The set of sensors 55 can be configured to provide respective sensor signals 56 indicative of predetermined parameters associated with operation of the motor 33. The electronic control unit 25 can be communicatively coupled with the set of sensors 55 to receive the sensor signals 56. The electronic control unit 25 is configured to output a control signal 26 to the inverter 24, based in part on the received sensor signals 56 and a predetermined or desired performance characteristic of the motor 33. The inverter 24 is configured to control an operation of the motor 33 based in part on the control signal 26 provided by the electronic control unit 25, by controlling the electrical power provided to the motor 33 to cause the motor 33 to operate in accordance with a predetermined motor performance parameter (e.g. an output torque, or a rotor speed).

The electrical power for operating the motor 33 can be provided by the power source 30 via a first set of power transmission lines 32, such as a DC power bus. In an aspect, the power source 30 can include a first set of power source output terminals 34 coupled via a respective power transmission line 32 to the inverter 24. In non-limiting aspects, the power source 30 can be, for example, a lithium ion rechargeable battery or a nickel metal hydride battery. In other aspects, the power source 30 can comprise a conventional DC power source, including but not limited to, a battery, photovoltaic panel, DC power supply, any other known source of DC electrical power, or a combination thereof.

In non-limiting aspects, the inverter 24 can be a DC-AC type inverter to convert DC power from the power source 30 to AC power. The inverter 24 can include an inverter input 21 configured to receive DC power from the power source 30. The inverter 24 can also include an inverter output 22 configured to provide AC power to the motor 33. The inverter input 23 can be coupled with the power source 30 via the first set of power transmission lines 32 to receive the DC power therefrom. The inverter output 22 can be coupled to a set of motor input terminals 31 of the motor 33 via a second set of power transmission lines 39 (e.g., a set of cables) to provide the AC power thereto, to thereby drive the motor 33.

As shown, in non-limiting aspects, the motor 33 can be configured as a conventional synchronous alternating current (AC) motor having a rotor and a stator (not shown) that operates through electromagnetic induction. In an aspect, the rotor can comprise a conventional permanent magnet type rotor, and the stator can comprise a wound stator (e.g., having three-phase coils wound thereon). The stator can be rotationally fixed within a motor housing. The motor 33 can be coupled (e.g., via the rotor) to a driveshaft 35 that is in turn rotatably coupled with the load 36. In such an aspect, AC current to operate the motor 33 can be supplied to the stator at the motor input terminals 31 via the second set of power transmission lines 39.

For ease of description and explanation, the non-limiting aspect illustrated in FIG. 1 depicts the motor 33 as an AC motor, and the inverter 24 as a DC-AC inverter. However, it will be appreciated that other aspects are not so limited. For example, in other non-limiting aspects, the motor 33 can comprise a DC motor. In such aspects the inverter 24 can instead comprise a DC to DC converter operative to convert DC power received from the power source 30 at a first DC voltage (e.g., 24V, 48V, or higher) and to produce DC power at a predetermined second voltage to operate the DC motor 33.

It is further contemplated that other aspects are not so limited, and the motor 33 can comprise any number or type of motor 33 or dynamoelectric machine. For example, in non-limiting aspects, the motor 33 can alternatively be configured to act as a generator 33. When operating the motor 33 as an electrical generator, a torque can be received via the driveshaft 35 that causes the rotor to rotate and an AC output current is generated by the stator at the motor input terminals 31, which thus acts as a motor output terminal 31 for providing the generated AC power to the second set of power transmission lines 39 (e.g., a set of cables). In such an aspect, the inverter 24 can be arranged as a bi-directional inverter 24, responsive to control signals provided by the electronic control unit 25 to enable the inverter 24 to receive AC input power at the inverter output 22 and to produce DC power at the inverter input 21. The DC power may be provided to the power source 30 via the first set of power transmission lines 32.

Furthermore, in the non-limiting aspect depicted in FIG. 1, the electronic control unit 25 is shown as a single integrated controller, but other aspects are not so limited. For example, in other aspects controller functions may be distributed between a set of electronic control units 25. In other non-limiting aspects, the electronic control unit 25 can be located in any desired location such as in or on, the motor 33, the power source 30, the inverter 24, or combinations thereof. The illustrated aspect of FIG. 1 is only one non-limiting example of a motor control system 20, and many other possible aspects, configurations, or the like, in addition to that shown are contemplated by aspects of the present disclosure. It will be understood that while aspects of the disclosure are shown, for ease of understanding, in the simple arrangement shown in FIG. 1, depicting a single power source 30, and a single motor 33, other aspects are not so limited and the disclosure herein has general application to electrical power systems or motor control systems having any number of power sources or motors.

The inverter 24 is operative to provide AC current (e.g., an excitation current) on the second set of power transmission lines 39, to be received by the motor 33 at the motor input terminals 31. The AC current causes the motor to operate and thereby generate a motor torque output. In non-limiting aspects, the inverter 24 can include a set of switching elements, illustrated as transistors T1 to T6, and a set of diodes, illustrated as diodes D1 to D6. Each diode D1-D6 is connected in parallel to a respective transistor T1-T16. The transistors T1-T6 can be arranged in pairs, such that two transistors in each pair respectively serve as a source and as a sink relative to a respective one of the power transmission lines 32.

Responsive to the control signal 26 from the electronic control unit 25, the inverter 24 can control the operation of the motor 33 by selectively operating the set of switching elements T1-T6, to control the AC current provided to the motor input 31 in response to the control signal 26. For example, in non-limiting aspects, the motor 33 can comprise a 3-phase AC motor and the respective phases of the three-phase of the motor 33 can be electrically coupled with the respective pairs of the transistors T1-T6. Accordingly, when a voltage is provided to the inverter input 21, the electronic control unit 25 is configured to regulate or control the rates of ON times of the respective pairs of the transistors T1-T6 to provide an AC current to the motor 33 and thereby drive the motor 33.

The electronic control unit 25 can include the controller module 51, for example, a microprocessor or microcontroller. The electronic control unit 25 can also include a memory 52. For example, the memory 52 can comprise read-only memory (ROM) configured to store processing programs, and random-access memory (RAM) configured to temporarily store data. The electronic control unit 25 can include a set of input/output (I/O) ports 54 to receive signals from the inverter 24 and to transmit the control signal 26 to the inverter 24. Additionally, the set of sensors 55 can be communicatively coupled to the electronic control unit 25 via the set of I/O ports 54. In various aspects, the set of sensors 55 can include any number of conventional sensors 55 arranged and disposed as desired to measure, detect, or otherwise sense a respective parameter, and provide a respective sensor signal 56 indicative of the respective sensed parameter to the electronic control unit 25.

The electronic control unit 25 can also comprise a predetermined desired or first target value (designated "Tv1") of a first performance characteristic (designated "Pc1") of the motor 33. For example, the predetermined first target value Tv1 can be stored in memory 52. In other aspects, the first target value Tv1 can be provided to the electronic control unit 25 from an external source or user (not shown) as an input, for example via an I/O port 54. In non-limiting aspects, the first performance characteristic Pc can be a rotational speed of the motor output, wherein the first target value Tv1 is a target rotor speed of the motor 33 in revolutions per minute (rpm). In other non-limiting aspects, the first performance characteristic Pc1 of the motor 33 can be an output torque of the motor shaft, where the first target value Tv1 is a target torque output of the motor 33 (e.g., a rotor torque) in Newton-meters (n-m). Other aspects are not so limited, and it is contemplated that the first performance characteristic Pc1 can be any desired performance characteristic associated with the operation of the motor 33 having any first target value Tv1 without departing from the scope of the disclosure. In various aspects, the first target value Tv1 can be, for example, expressed in conventional units of one of speed, torque, current, voltage, power, or some other predetermined unit without departing from the scope of the disclosure. In some aspects, the first target value Tv1 of the first performance characteristic Pc1 of the motor 33 can vary based on predetermined parameters or conditions. For example, the target value Tv1 of the first performance characteristic Pc1 of the motor 33 may vary based on a state or operating mode (e.g., start-up mode, drive-mode, etc.) of the motor 33 or the load 36.

The electronic control unit 25 can also comprise a predetermined desired or second target value (designated "Tv2") of a second performance characteristic (designated "Pc2") of the motor 33. The predetermined second target value Tv2 can be stored in memory 52. In other aspects, the second target value Tv2 can be provided to the electronic control unit 25 from an external source or user (not shown) as an input, for example via an I/O port 54. In non-limiting aspects, the second performance characteristic Pc2 can be correlated, associated with, or otherwise related to, the first performance characteristic Pc1. It will be appreciated that the predetermined second target value Tv2 can be correlated to the first target value TV1 for a particular motor 33 or load 36. For example, a particular motor 33 driving a particular load 36 can be known to exhibit a desired motor speed when a predetermined target AC phase current is being supplied to the motor 33. In such non-limiting aspects, the first performance characteristic Pc1 can be a rotational speed output of the motor 33, wherein the first target value Tv1 can be a predetermined rotor speed in rpm, and the second performance characteristic Pc2 can be a respective phase current of the motor 33, wherein the second target value Tv2 can be a predetermined AC phase current supplied to the motor 33 in amperes (A). In another non-limiting example, a particular motor 33 can be known to exhibit a desired motor speed with a particular torque output of the motor 33. In such non-liming aspects, the first performance characteristic Pc1 can be a rotational speed output of the motor 33, wherein the first target value Tv1 can be a predetermined rotor speed in rpm, and the second performance characteristic Pc2 can be a predetermined output torque of the motor 33 wherein the second target value Tv2 is a predetermined motor torque in n-m. It will be understood that these examples are not intended to be in any way limiting, and in other aspects the first performance characteristic Pc1 and second performance characteristic Pc2 can comprise any desired related performance characteristics associated with the operation of the motor 33 having any desired first and second target values Tv1, Tv2, without departing from the scope of the disclosure herein.

The controller module 51 can be further configured to calculate or determine an error value (designated "Ev"). In non-limiting aspects, the Ev can be recorded (e.g., saved to the memory 52). For example, the control module 51 can determine the error value Ev based on a comparison of the first target value Tv1 and a measured value (designated "Mv"). The measured value Mv can be indicated, derived from, or otherwise provided by one or more sensor signals 56 In non-limiting aspects, the measured value Mv can be recorded (e.g., saved to memory 52). In various aspects, the measured value Mv can be, for example, expressed in conventional units of one of speed, torque, current, voltage, power, or some other predetermined unit without departing from the scope of the disclosure.

The electronic control unit 25 can receive the sensor signals 56 comprising information indicative of predetermined parameters associated with operation of the motor 33 or motor control system 20, or both, to the electronic control unit 25. For example, the sensor signals 56 can provide information indicative of the first target value Tv1 or second target value Tv2, or both. In non-limiting aspects, the respective sensor signals 56 provided from the set of sensors 55 can comprise, without limitation, information indicative of: a phase current from a set of current sensors 55 arranged to detect the phase currents of the respective phases of the motor 33, a rotational position of the rotor of the motor 33 from a rotational position detection sensor (for example, a resolver) 55; a motor speed (e.g., a rotational speed, e.g., of the rotor of the motor 33) from a speed sensor 55; a motor torque output of the motor 33 from a torque sensor 55; a voltage of the power source 30 from a voltage sensor 55 placed between terminals of the power source 30; an electric current of the power source 30 from a current sensor 55 mounted to an output terminal of the power source; an inverter input voltage from a voltage sensor 55; or a motor temperature from a temperature sensor 55 coupled to the motor 33, and combinations thereof. It will be appreciated that the foregoing listing of sensors 55 is given by way of example, and other aspects are not so limited. In various other aspects, any number of sensors 55 can be arranged and disposed to provide a respective sensor signal 56 indicative of any desired parameter to the electronic control unit 25 without departing from the scope of the disclosure herein.

In non-limiting aspects, the controller module 51 can be configured to calculate or determine the error value Ev based on a comparison of the first target value Tv and a corresponding measured value Mv of the first performance characteristic Pc1. The error value Ev can thus be indicative of a difference between the respective first target value Tv1 and the measured value Mv of the first performance characteristic Pc1. The controller module 51 can be further configured to determine, based on the determined error value Ev, an initial or first demand value, (designated "Dv1") corresponding to the second performance characteristic Pc2.

In non-limiting aspects, the controller module 51 can determine the first demand value Dv1 using a predetermined transfer function, algorithm, look-up table, or other method configured to derive or determine the first demand value Dv1. For example, the predetermined transfer function can be based on a relationship between a particular error value Ev and the second performance characteristic Pc2 for a particular motor 33. For example, in non-limiting aspects, the first demand value Dv1 can comprise a "delta-torque", that is, a difference between a desired torque output of motor 33 and a measured torque output of motor 33. The differential value or delta-torque can represent an "error" with reference to the difference between the measured value Mv and the desired value of the motor 33 torque output. The controller module 51 can be further configured to provide an error signal 371 to the regulator portion 50 that is indicative of the first demand value Dv1 as a delta torque. In other non-limiting aspects, the first demand value Dv1 can comprise a "delta-current", that is, a difference between the desired current supplied to the input of motor 33 and a measured current input to the motor 33. The differential value or delta-current can represent an "error" with reference to the difference between the measured value and the desired value of the input current to the motor 33. The controller module 51 can be further configured to provide an error signal 371 to the regulator portion 50 that is indicative of the first demand value Dv1 as a delta-current. Other aspects are not so limited and the first demand value Dv1 can comprise a difference between any measured and desired value of any predetermined parameter associated with the operation of the motor 33. Regardless of the predetermined parameter, the controller module 51 can be further configured to provide the error signal 371 to the regulator portion 50 that is indicative of the first demand value Dv1.

Figure 2:
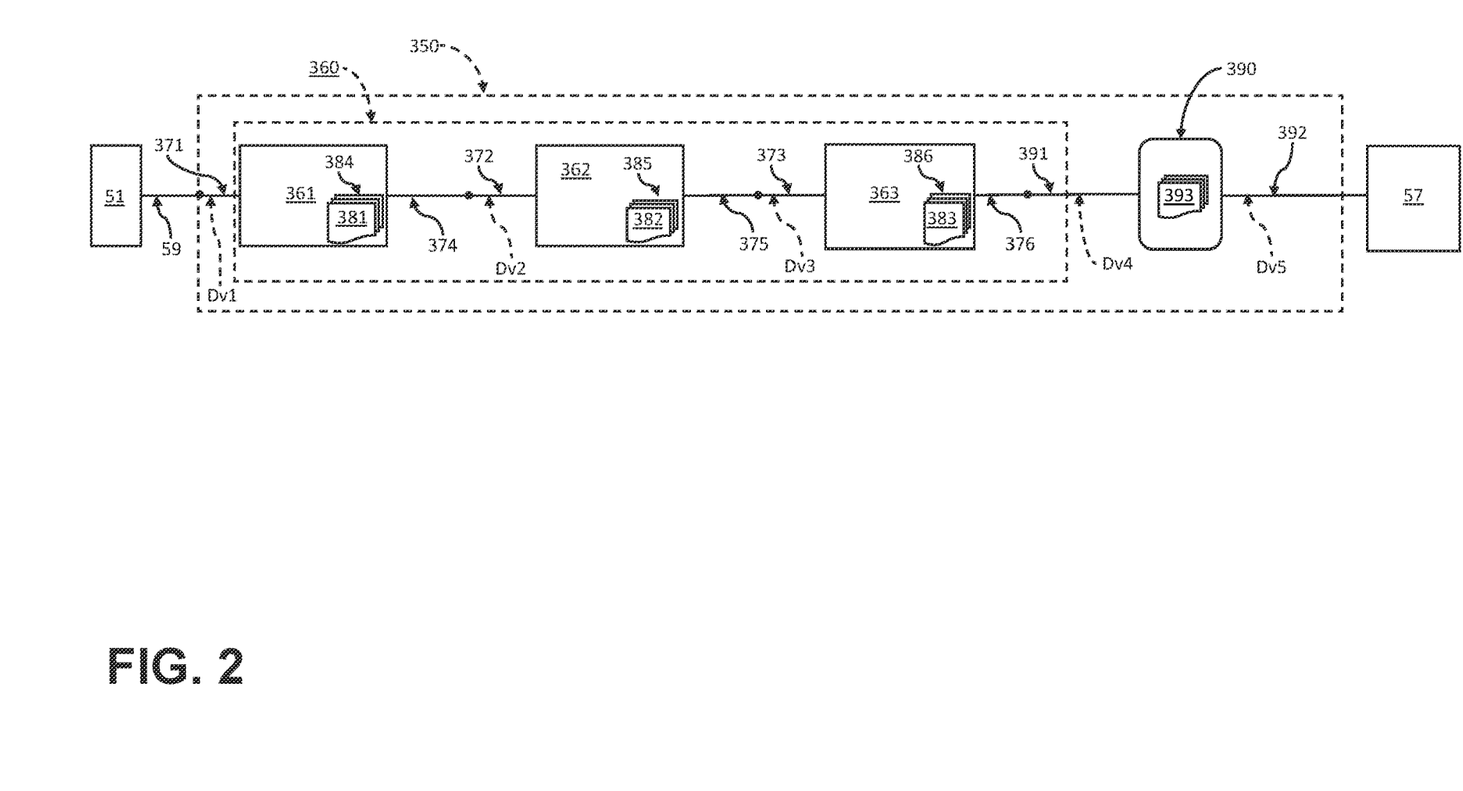
FIG. 2 is a schematic view of a regulator module in accordance with various aspects described herein.

With reference to FIG. 2, a non-limiting aspect of a regulator portion 350 of the electronic control unit 25 of FIG. 1 is shown in more detail. The regulator portion 350 comprises a set of regulator modules 360 communicatively coupled in a sequence. The regulator portion 350 can receive an error signal 371, as a first regulator input signal 371, from the controller module 51 indicative of the first demand value Dv1, and provide an integrator output signal 392 indicative of a final demand value (designated "Dv5"), based on the first demand value Dv1, to the control portion 57 of the controller module 51. As shown, the set of regulator modules 360 can include a first regulator module 361, a second regulator module 362, and a third regulator module 363. Each regulator module 361, 362, 363 can comprise a respective memory 381, 382, 383 configured to store a respective selectable value 384, 385, 386. For example, the first regulator module 361 can comprise a first memory 381 configured to store a first selectable value 384, the second regulator module 362 can comprise a second memory 382 configured to store a second selectable value 385, and the third regulator module 363 can comprise a third memory 383 configured to store a third selectable value 386. The selectable value 384 can be a predetermined discrete value. In non-limiting aspects the respective selectable value 384, 385, 386 can vary based on an operating mode or state of the motor 33 or load 36. In other non-limiting aspects, the respective selectable value 384, 385, 386 can vary based on any desired set of predetermined rules. For example, in non-limiting aspects, the controller module 51 can calculate the respective selectable value 384, 385, 386 for each regulator module 361, 362, 363 based on an operating mode or state of the motor 33 or load 36 and a set of predetermined rules, and save each respective selectable value 384, 385, 386 to the respective memory 382, 383, 384. The regulator portion 350 can also include an integrator module 390 communicatively coupled to the last regulator module 363 in the sequence to receive an integrator input signal 391 therefrom. The integrator module 390 can include an integrator module memory 393.

Each regulator module 361, 362, 363 is configured to receive a respective input signal and provide a respective output signal. As shown, the first regulator module 361 receives the first regulator input signal 371 and provides a first regulator output signal 374; the second regulator module 362 receives a second regulator input signal 372 and provides a second regulator output signal 375; the third regulator module 363 receives a third regulator input signal 373 and provides a third regulator output signal 376. It will be appreciated that, as shown, the first regulator output signal 371 can be received by the second regulator module 362 as the second regulator input signal 372; the second regulator output signal 375 can be received by the third regulator module 363 as the third regulator input signal 373; the third regulator output signal 376 can be received by the integrator module 390 as the integrator input signal 391. Each respective input signal 371, 372, 373, 391 can be indicative of a respective demand value (e.g., a value of change or adjustment to the motor 33 torque output with respect to the determined or measured motor 33 torque output). As depicted, the first regulator input signal 371 is indicative of the first demand value Dv1, the second regulator input signal 372 is indicative of a second demand value (designated "Dv2"), the third regulator input signal 373 is indicative of a third demand value (designated "Dv3"), and the integrator input signal 391 is indicative of a fourth demand value (designated "Dv4").

Each regulator module 361, 362, 363 can be configured to selectively alter, adjust, modify, or otherwise regulate the demand value Dv1, Dv2, Dv3 indicated by the respective input signal 371, 372, 373, based on a respective set of predetermined rules or parameters, and provide the respective output signal 374, 375, 376 indicative of the selectively modified or regulated demand value Dv2, Dv3, Dv4. For example, the first regulator module 361 in the sequence can be communicatively coupled to the electronic control module 51 to receive the signal 371 (i.e., indicative of the first demand value Dv1) as the respective input signal 371 therefrom. The first regulator module 361 can selectively regulate the first demand value Dv1 based on a respective set of predetermined rules or parameters, and provide the first regulator output signal 374 indicative of the second demand value Dv2. The first regulator output signal 374 can be received by the immediately next regulator module in the sequence (i.e., the second regulator module 362), as the second regulator input signal 372. The second regulator module 362 can regulate the second demand value Dv2 based on a respective set of predetermined rules, and provide the second regulator output signal 375 indicative of the third demand value Dv3. The second regulator output signal 375 can be received by the immediately next regulator module in the sequence (i.e., the third regulator module 363), as the third regulator input signal 373. The last regulator module in the sequence, (i.e., the third regulator module 363) can regulate the third demand value Dv3 based on a respective set of predetermined rules, and provide the third regulator output signal 376 indicative of the fourth demand value Dv4. The third regulator output signal 376 provided by the third regulator module 363 (i.e., the last regulator module in the sequence) can be received by the integrator module 390, as the integrator input signal 391.

In non-limiting aspects, the respective predetermined rules can include satisfying respective predetermined criteria for the motor 33 operation. For example, in non-limiting aspects, the respective predetermined criteria can include any one of a maximum acceleration, a maximum deceleration limit, a maximum speed, a minimum speed, a maximum current, a maximum output torque, or a minimum output torque of the motor 33, or can be any other desired parameter.

Additionally, for each of the regulator modules 361, 362, 363, the regulating the respective demand value Dv1, Dv2, Dv3 based on the predetermined respective set of rules or parameters can include, one of selectively increasing the respective demand value Dv1, Dv2, Dv3 of the received respective input signal 371, 372, 373, selectively decreasing the demand value Dv1, Dv2, Dv3 of the received respective input signal 371, 372, 373, and selectively making no change or modification to the demand value Dv1, Dv2, Dv3 of the received respective input signal 371, 372, 373. For example, a particular regulator module 361, 362, 363 can be configured to selectively increase the demand value Dv1, Dv2, Dv3 of the received respective input signal 371, 372, 373 based on respective predetermined rules, but not decrease the demand value Dv1, Dv2, Dv3 of the received respective input signal 371, 372, 373. Alternatively, another particular regulator module 361, 362, 363 can be configured to selectively decrease the demand value Dv1, Dv2, Dv3 of the received respective input signal 371, 372, 373 based on respective predetermined rules, but not increase the demand value Dv1, Dv2, Dv3 of the received respective input signal 371, 372, 373.

More specifically, in aspects, each regulator module 361, 362, 363 can be configured to compare the respective demand value Dv1, Dv2, Dv3, Dv4 (i.e., as indicated by the respective input signal 371, 372, 373) to the respective selectable value 384, 385, 386. Based on the comparison, each regulator module 361, 362, 363 can be further configured to select either the greater, or the lesser, of the demand value Dv1, Dv2, Dv3 and the respective selectable value 384, 385, 386. That is, each regulator module 361, 362, 363 can be configured to be either a maximum-value-selecting regulator or a minimum-value-selecting regulator, with respect to the comparison between the demand value Dv1, Dv2, Dv3, and the respective selectable value 384, 385, 386. For example, a particular regulator module 361, 362, 363 that is configured to be a maximum-value-selecting regulator module 361, 362, 363, can select the larger of the demand value Dv1, Dv2, Dv3 and the respective selectable value 384, 385, 386. Similarly, a particular regulator module 361, 362, 363 that is configured to be a minimum-value-selecting regulator module 361, 362, 363 can select the smaller of the demand value Dv1, Dv2, Dv3 and the respective selectable value 384, 385, 386.

In non-limiting aspects, each regulator module 361, 362, 363 can be further configured to provide the respective output signal 374, 375, 376 indicative of the respective selected maximum value or minimum value, as a respective demand value Dv2, Dv3, Dv4. That is, each regulator module 361, 362, 363 can be configured to selectively modify or regulate the respective received demand value Dv1, Dv2, Dv3, (as indicated by the respective input signal 371, 372, 373), in accordance with the respective selected maximum value or minimum value. Each regulator module 361, 362, 363 can then provide the respective output signal 374, 375, 376 that is indicative of modified or regulated demand value Dv2, Dv3, Dv4.

It will be appreciated that the respective demand value Dv2, Dv3, Dv4 can comprise an incremental difference or change to the demand value Dv1, Dv2, Dv3 provided by the immediately prior regulator module 361, 362, 363 in the sequence. As such, each regulator module 361, 362, 263 in the sequence can have a relative priority with respect to the other regulator modules 362, 362, 363 in the sequence. In non-limiting aspects, the regulator modules 361, 362, 363 can be arranged in an order of increasing predetermined priority for satisfying the respective criteria (e.g., maximum acceleration, a maximum deceleration limit, a maximum speed, a minimum speed, a maximum current, a maximum output torque, or a minimum output torque of the motor 33) for each regulator module 361, 362, 363.

The integrator module 390 can include a measured or sensed value Mv (e.g., a measured value of the motor output torque (designated "Tm")). By way of a non-limiting example, the most recent measured or sensed value Mv (i.e., from the set of sensors 55) of the motor 33 output torque Tm can be saved to the integrator module memory 393. In other non-limiting aspects, the measured value Mv can be saved to the controller module memory 52 and provided to the integrator module 390. The integrator module 390 can be configured to add, combine, sum, or otherwise integrate the saved measured value Mv (e.g., the motor output torque Tm) and the demand value Dv4 received from the last or final regulator module 360 in the sequence (i.e., via the integrator input signal 391). In aspects, the final demand value Dv5 can be determined based at least in part on the demand value Dv4. For example, in non-limiting aspects, the sum of the value of the integrated measured value Mv (e.g., the motor output torque Tm) saved to the integrator module memory 393 and the demand value Dv4 can comprise the final demand value Dv5. The integrator module 390 can be further configured to provide an integrator output signal 392 indicative of the final demand value Dv5 to the control portion 57 of the controller module 51.

In aspects, the final demand value Dv5 can be indicative of a value of change or adjustment to the second performance characteristic Pc2 of the motor 33 with respect to the sensed or measured value Mv. For example, in non-limiting aspects, the final demand value Dv5 can comprise a value of a "delta-torque command" to the control portion 57 of the controller module to indicate a target or desired adjustment to the torque output of the motor 33. In other non-limiting aspects, the final demand value Dv5 can comprise a "delta-current command to the control portion 57 of the controller module to indicate a target or desired adjustment to the output speed of the motor 33. Other aspects are not so limited and the final demand value Dv5 can comprise any desired value of any predetermined parameter associated with the operation of the motor 33.

The control portion 57 of the controller module is configured to receive the integrator output signal 392 indicative of the final demand value Dv5, and to translate the final demand value Dv5 into the control signal 26. The control signal 26 can be provided to the inverter 24 by the electronic control unit 25. The control portion 57 can use any desired conventional technique to map the final demand value Dv5 to an inverter control signal. For example, in non-limiting aspects, the control portion 57 can be configured to map the demand value to a predetermined pulse-width modulation (PWM) schedule to control the operation and timing of the inverter switches or transistors T1-T6. In other aspects, predefined algorithms can be defined to control the inverter operation based on the control signal 26.

Figure 3:
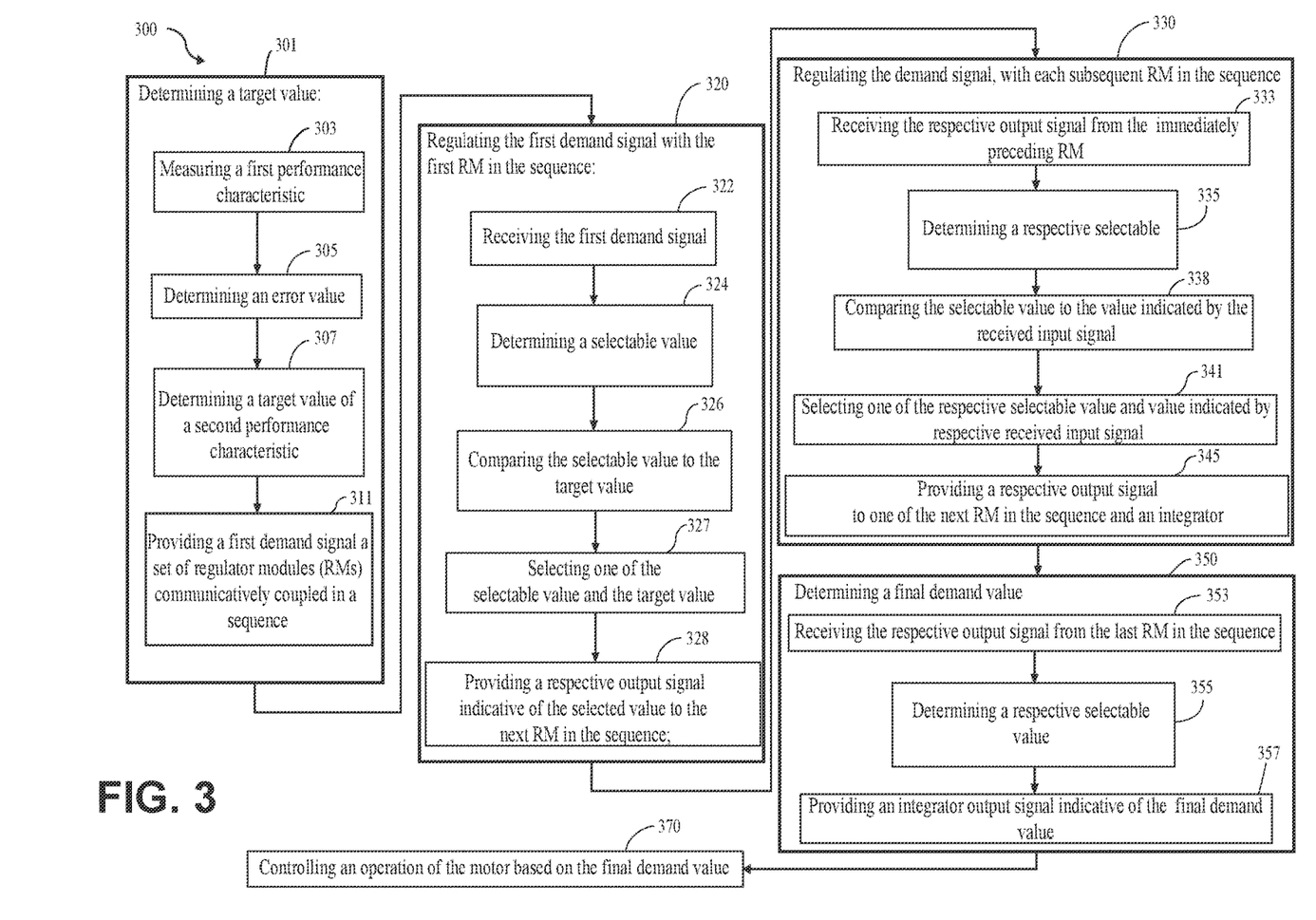
FIG. 3 is a flow diagram of a method of controlling a motor in accordance with various aspects described herein.

FIG. 3 illustrates a flow chart demonstrating a method 300 of controlling operation of a motor 33 by utilizing aspects of the electronic control unit 25 as described herein. The electronic control unit 25 can comprise a controller module 51 having a memory 52 and a control portion or 57, a regulator portion 50 and an integrator portion 53. The method 300 begins, at 301 by determining a target value. The determining a target value can include measuring a first performance characteristic Pc1 of the motor 33 to define a measured value Mv at 303, and at 305, determining, with the electronic control unit 25, an error value Ev indicative of a difference between a target value of the first performance characteristic Pc1 of the motor 33 and the measured value Mv of the first performance characteristic Pc1. The determining a target value can also include, at 307 determining, based on the error value Ev, a target value Tv2 of a second performance characteristic Pc2 of the motor 33. At 311, the method 300 can include providing, from the electronic control unit 25, a first demand signal 59 indicative of the target value of the second performance characteristic Pc2, to the regulator portion 350.

The regulator portion can comprise a set of regulator modules 360 communicatively coupled in a sequence, each regulator module 361, 362, 363 configured to receive a respective input signal 371, 372, 373 and provide a respective output signal 374, 375, 376. The method 300 includes at 320, regulating the first demand signal with the first regulator module 361 in the sequence. The regulating the first demand signal with the first regulator module 361 in the sequence includes at 322, receiving, as the respective input signal 371, the first demand signal 59, and at 324, determining, a respective selectable value that is a fraction of the target value of the second performance characteristic Pc2. In non-limiting aspects, the respective selectable value 384 can be a fixed predetermined value that is stored in memory. In other aspects, the respective selectable value 384 can vary based on predetermined conditions, such as a state or condition of the motor 33 or load 36. For example, in non-limiting aspects, the controller module 51 can calculate the respective selectable value 384 for the first regulator module 361 in the sequence based on an operating mode or state of the motor 33 or load 36 and a set of predetermined rules, and save the respective selectable value 384 to the memory 381.

The method 300 includes, comparing, by the first regulator module 361 in the sequence, the respective selectable value to the target value of the second performance characteristic Pc2, at 326. The regulating the first demand signal with the first regulator module 361 in the sequence includes at 327, selecting one of the respective selectable value and the target value of the second performance characteristic Pc2 based on predetermined selection criteria. The method 300 includes providing the respective output signal 374 indicative of the selected value to the next regulator module 362 in the sequence, at 328.

The method 300 includes at 330, regulating the demand signal with the remaining regulator modules 362, 363 in the sequence. The regulating the demand signal with the remaining regulator modules 362, 363 in the sequence includes at 333, receiving, as the respective input signal 372, 373, the respective output signal 374, 375, 376 from the immediately preceding regulator module 361, 362 in the sequence indicative of the respective selected value of the immediately preceding regulator module 361, 362 in the sequence, and at 335 determining, a respective selectable value 385, 386 that is a fraction of the target value of the second performance characteristic Pc2. In non-limiting aspects, the respective selectable value 385, 386 can be a fixed predetermined value that is stored in memory 382, 383. In other aspects, the respective selectable value 385, 386 can vary based on predetermined conditions, such as a state or condition of the motor 33 or load 36. For example, in non-limiting aspects, the controller module 51 can calculate the respective selectable value 385, 386 for the second regulator module 362 and third regulator module 363 based on an operating mode or state of the motor 33 or load 36 and a set of predetermined rules, and save the respective selectable value 385, 386 to the memory 382, 383. The regulating the demand signal with the remaining regulator modules 362, 363 in the sequence includes comparing the respective selectable value to the value indicated by the respective input signal 372, 373 at 338. Then, at 341, selecting one of the respective selectable value and value indicated by the respective received input signal 372, 373 based on respective predetermined selection criteria, and providing the respective output signal 375, 376 indicative of the respective selected value to one of the next regulator module 386 in the sequence and the integrator module 390, at 345. Non-limiting aspects of the method 300 can include determining a final demand value Dv5 value with the integrator module at 350. In aspects, the determining a final demand value Dv5 value can be based on the value indicated by the output signal 376 from the last regulator module 363 in the sequence. The determining a final demand value Dv5 can include receiving, as an integrator input signal 391, the respective output signal 376 from the last regulator module 363 in the sequence at 353, and calculating the final demand value Dv5 value based on the value indicated by the respective output signal 376. In some aspects, the determining a final demand value Dv5 can include adding, summing, or otherwise integrating the value indicated by the integrator input signal 391 and a predetermined or measured value My stored in the integrator memory 383 at 355. The method 300 can include providing an integrator output signal 392 indicative of the final demand value Dv5, at 357. The method 300 can further include, at 359, controlling an operation of the motor 33 based on the final demand value Dv5.

The sequence depicted is for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

Further aspects are provided by the subject matter of the following clauses:

A system for controlling a motor, the system comprising a controller module comprising a controller portion, a regulator portion and an integrator portion, the controller portion communicatively coupled to the regulator portion, and configured to: determine an error value indicative of a difference between a desired value of a first performance characteristic of the motor and a measured value of the first performance characteristic; determine a target value of a second performance characteristic of the motor based on the error value, provide a first demand signal, indicative of the target value of the second performance characteristic, to the regulator portion; the regulator portion comprising a set of regulator modules communicatively coupled in a sequence, each regulator module configured to receive a respective input signal and provide a respective output signal; wherein a first regulator module in the sequence is configured to: receive, as the respective input signal, the first demand signal; determine, based on a predetermined performance criteria, a respective selectable value that is a fraction of the target value of the second performance characteristic; compare the respective selectable value to the target value of the second performance characteristic; select one of the respective selectable value and the target value of the second performance characteristic, based on a predetermined selection criteria; and provide the respective output signal indicative of the selected value to a next regulator module in the sequence; wherein each subsequent regulator module in the sequence is configured to: receive, as the respective input signal, the respective output signal from the immediately preceding regulator module in the sequence indicative of the respective selected value of the immediately preceding regulator module in the sequence; determine, based on respective predetermined performance criteria, a respective selectable value that is a fraction of the target value of the second performance characteristic; compare the respective selectable value to the value indicated by the received input signal; select one of the respective selectable value and value indicated by the respective received input signal, based on respective predetermined selection criteria; and provide the respective output signal indicative of the respective selected value to one of the next regulator module in the sequence and the integrator portion; the integrator portion configured to: receive the respective output signal from the last regulator module in the sequence, and calculate a final demand value based on the value indicated by the signal received from the last regulator module in the sequence; and provide an integrator output signal indicative of the final demand value.

The system of any preceding clause, wherein the integrator portion provides the integrator output signal to a motor control portion of the controller module.

The system of any preceding clause, wherein the first performance characteristic is one of a motor speed, a motor voltage, a motor torque, and a motor current.

The system of any preceding clause, wherein the second performance characteristic is one of a motor torque, and a motor current.

The system of any preceding clause, wherein the predetermined selection criteria includes selecting the one of the respective selectable value and the value indicated by the respective input signal having one of a greater numeric value and a lesser numeric value.

The system of any preceding clause, wherein the integrator portion is further configured to store the final demand value in a memory.

The system of any preceding clause, wherein each regulator module of the set of regulator modules comprises a relative priority with respect to the other regulator modules.

The system of any preceding clause, wherein the regulator modules are communicatively coupled in the sequence in ascending order of their respective relative priority.

The system of any preceding clause, wherein the respective selectable value is one of a fraction and a multiple of the value indicated by the received input signal.

The system of any preceding clause, wherein the respective selectable value is further based on an operating state of the motor.

The system of any preceding clause, wherein the motor control portion is configured to control a speed of the motor based on the final demand value.

A method of controlling a motor comprising: measuring a first performance characteristic of the motor to define a measured value; determining an error value indicative of a difference between a desired value of the first performance characteristic of the motor and the measured value of the first performance characteristic, determining a target value of a second performance characteristic of the motor based on the error value, providing a first demand signal, indicative of the target value of the second performance characteristic, to a regulator portion comprising a set of regulator modules communicatively coupled in a sequence, each regulator module configured to receive a respective input signal and provide a respective output signal; with the first regulator in the sequence, performing the steps of: receiving, as the respective input signal, the first demand signal; determining, based on predetermined performance criteria, a respective selectable value that is a fraction of the target value of the second performance characteristic; comparing the respective selectable value to the target value of the second performance characteristic; selecting one of the respective selectable value and the target value of the second performance characteristic, based on a predetermined selection criteria; and providing the respective output signal indicative of the selected value to the next regulator module in the sequence; performing, with each subsequent regulator module in the sequence, the steps of: receiving, as the respective input signal, the respective output signal from the immediately preceding regulator module in the sequence indicative of the respective selected value of the immediately preceding regulator module in the sequence; calculating, based on respective predetermined performance criteria, a respective selectable value that is a fraction of the target value of the second performance characteristic; comparing the respective selectable value to the value indicated by the received input signal; selecting one of the respective selectable value and value indicated by the respective received input signal, based on respective predetermined selection criteria; and providing the respective output signal indicative of the respective selected value to one of the next regulator module in the sequence and the integrator module; performing, with the integrator module, the steps of receiving the respective output signal from the last regulator module in the sequence; determining a final demand value based on the value indicated by the signal received from the last regulator module in the sequence; and providing an integrator output signal indicative of the final demand value to a motor controller module; and controlling an operation of the motor based on the final demand value.

The method of any preceding clause, wherein the first performance characteristic is one of a motor speed, a motor voltage, a motor torque, and a motor current.

The method of any preceding clause, wherein the second performance characteristic is one of a motor torque, and a motor current.

The method of any preceding clause, wherein the predetermined selection criteria includes selecting the one of the respective selectable value and the value indicated by the received input signal having one of a greater numeric value and a lesser numeric value.

The method of any preceding clause, further including storing the final demand value in a memory of the integrator module.

The method of any preceding clause, wherein each regulator module of the set of regulator module s comprises a relative priority with respect to the other regulator modules.

The method of any preceding clause, wherein the regulator modules are communicatively coupled in the sequence in an ascending order with respect to their respective relative priority.

The method of any preceding clause, wherein the respective selectable value is one of a fraction and a multiple of the value indicated by the received input signal.

The method of any preceding clause, wherein the respective selectable value is further based on an operating state of the motor.

What is claimed is:

1. A system for controlling a motor, the system comprising:
  a controller module comprising a control portion, a regulator portion and an integrator portion, the control portion communicatively coupled to the regulator portion, and configured to:
    (a) determine an error value indicative of a difference between a desired value of a first performance characteristic of the motor and a measured value of the first performance characteristic;
    (b) determine a target value of a second performance characteristic of the motor based on the error value,
    (c) provide a first demand signal, indicative of the target value of the second performance characteristic, to the regulator portion;
  the regulator portion comprising a set of regulator modules communicatively coupled in a sequence, each regulator module configured to receive a respective input signal and provide a respective output signal;
  wherein a first regulator module in the sequence is configured to:
    a) receive, as the respective input signal, the first demand signal;

b) determine, based on predetermined performance criteria, a respective selectable value that is a fraction of the target value of the second performance characteristic;
c) compare the respective selectable value to the target value of the second performance characteristic;
d) select one of the respective selectable value and the target value of the second performance characteristic, based on predetermined selection criteria; and
e) provide the respective output signal indicative of the selected value to a next regulator module in the sequence;

wherein each subsequent regulator module in the sequence is configured to:
a) receive, as the respective input signal, the respective output signal from the immediately preceding regulator module in the sequence indicative of the respective selected value of the immediately preceding regulator module in the sequence;
b) determine, based on respective predetermined performance criteria, a respective selectable value that is a fraction of the target value of the second performance characteristic;
c) compare the respective selectable value to the value indicated by the received input signal;
d) select one of the respective selectable value and value indicated by the respective received input signal, based on respective predetermined selection criteria; and
e) provide the respective output signal indicative of the respective selected value to one of the next regulator module in the sequence and the integrator portion;

the integrator portion configured to:
a) receive the respective output signal from the last regulator module in the sequence, and
b) calculate a final demand value based on the value indicated by the signal received from the last regulator module in the sequence; and
c) provide an integrator output signal indicative of the final demand value.

2. The system of claim 1, wherein the integrator portion provides the integrator output signal to the control portion.

3. The system of claim 1, wherein the first performance characteristic is one of a motor speed, a motor voltage, a motor torque, and a motor current.

4. The system of claim 1, wherein the second performance characteristic is one of a motor torque, and a motor current.

5. The system of claim 1, wherein the predetermined selection criteria includes selecting the one of the respective selectable value and the value indicated by the respective input signal having one of a greater numeric value and a lesser numeric value.

6. The system of claim 1, wherein the integrator portion is further configured to store the final demand value in a memory.

7. The system of claim 1, wherein each regulator module of the set of regulator modules comprises a relative priority with respect to the other regulator modules.

8. The system of claim 7, wherein the regulator modules are communicatively coupled in the sequence in ascending order of their respective relative priority.

9. The system of claim 1, wherein the respective selectable value is one of a fraction and a multiple of the value indicated by the received input signal.

10. The system of claim 1, wherein the respective selectable value is further based on an operating state of the motor.

11. The system of claim 2, wherein the motor control portion is configured to control a speed of the motor based on the final demand value.

12. A method of controlling a motor comprising:
measuring a first performance characteristic of the motor to define a measured value;
determining an error value indicative of a difference between a desired value of the first performance characteristic of the motor and the measured value of the first performance characteristic,
determining a target value of a second performance characteristic of the motor based on the error value,
providing a first demand signal, indicative of the target value of the second performance characteristic, to a regulator portion comprising a set of regulator modules communicatively coupled in a sequence, each regulator module configured to receive a respective input signal and provide a respective output signal;
with the first regulator in the sequence, performing the steps of:
receiving, as the respective input signal, the first demand signal;
determining, based on predetermined performance criteria, a respective selectable value that is a fraction of the target value of the second performance characteristic;
comparing the respective selectable value to the target value of the second performance characteristic;
selecting one of the respective selectable value and the target value of the second performance characteristic, based on predetermined selection criteria; and
providing the respective output signal indicative of the selected value to the next regulator module in the sequence;
performing, with each subsequent regulator module in the sequence, the steps of:
receiving, as the respective input signal, the respective output signal from the immediately preceding regulator module in the sequence indicative of the respective selected value of the immediately preceding regulator module in the sequence;
calculating, based on respective predetermined performance criteria, a respective selectable value that is a fraction of the target value of the second performance characteristic;
comparing the respective selectable value to the value indicated by the received input signal;
selecting one of the respective selectable value and value indicated by the respective received input signal, based on respective predetermined selection criteria; and
providing the respective output signal indicative of the respective selected value to one of the next regulator module in the sequence and an integrator module;
performing, with the integrator module, the steps of
receiving the respective output signal from the last regulator module in the sequence;
determining a final demand value based on the value indicated by the signal received from the last regulator module in the sequence; and
providing an integrator output signal indicative of the final demand value to a motor controller module; and
controlling an operation of the motor based on the final demand value.

13. The method of claim 12, wherein the first performance characteristic is one of a motor speed, a motor voltage, a motor torque, and a motor current.

14. The method of claim 12, wherein the second performance characteristic is one of a motor torque, and a motor current.

15. The method of claim 12, wherein the predetermined selection criteria includes selecting the one of the respective selectable value and the value indicated by the received input signal having one of a greater numeric value and a lesser numeric value.

16. The method of claim 12, further including storing the final demand value in a memory of the integrator module.

17. The method of claim 12, wherein each regulator module of the set of regulator module s comprises a relative priority with respect to the other regulator module s.

18. The method of claim 17, wherein the regulator modules are communicatively coupled in the sequence in an ascending order with respect to their respective relative priority.

19. The method of claim 12, wherein the respective selectable value is one of a fraction and a multiple of the value indicated by the received input signal.

20. The method of claim 12, wherein the respective selectable value is further based on an operating state of the motor.

\* \* \* \* \*